UNITED STATES PATENT OFFICE.

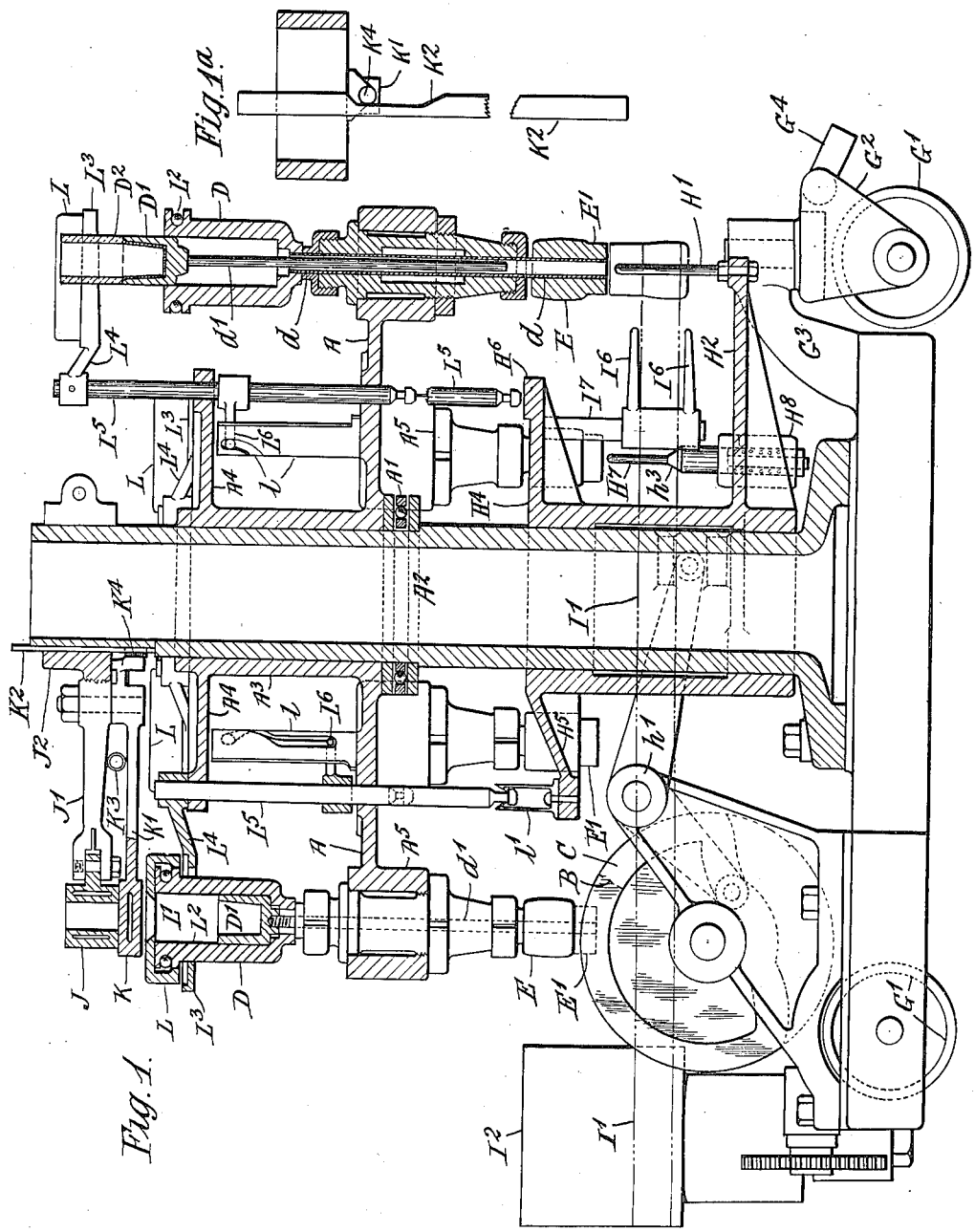

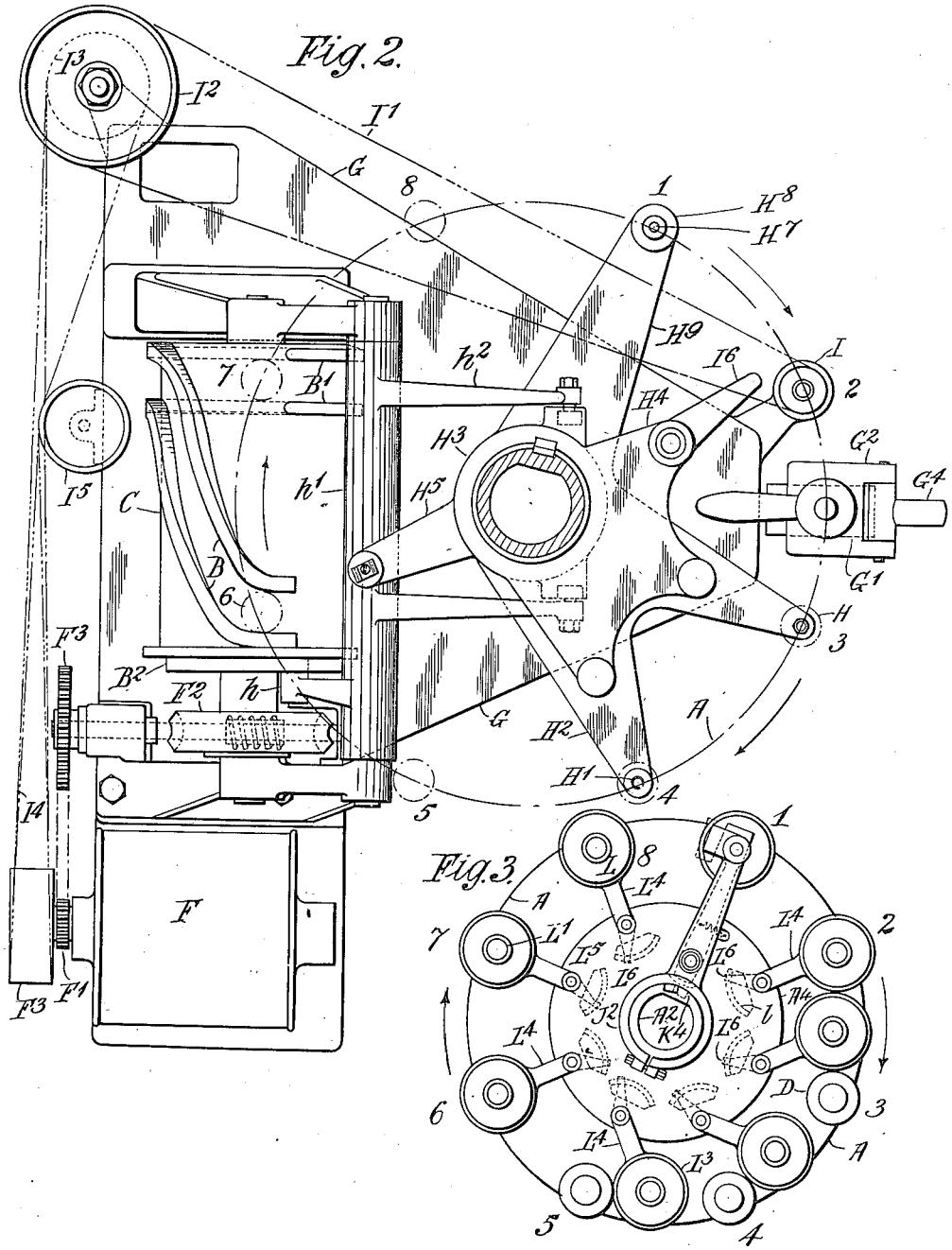

LOUIS N. BRUNER, OF ZURICH, SWITZERLAND, AND SIMON DOKK OLSEN, OF HUNSLET, LEEDS, ENGLAND.

APPARATUS FOR MANUFACTURING HOLLOW GLASSWARE.

1,301,378.  Specification of Letters Patent.  Patented Apr. 22, 1919.

Application filed October 13, 1917. Serial No. 196,435.

*To all whom it may concern:*

Be it known that we, LOUIS NAGLEE BRUNER, a citizen of the United States, and SIMON DOKK OLSEN, a subject of the King of Norway, residents, respectively of 7 Bellerivestrasse, Zurich, Switzerland, and 3 Springfield Crescent, Hunslet, Leeds, England, have invented certain new and useful Improvements in or Relating to Apparatus for Manufacturing Hollow Glassware, of which the following is a specification.

This invention has reference to the manufacture of hollow glass ware and to means or apparatus therefor, and relates more particularly to the manufacture of short glass tubes or cylinders such as used for chimneys for miners' lamps.

A feature of the invention is that the glass article or cylinder is formed by centrifugal force in a rotating mold provided with a cup which works up and down therein piston-wise. The cup is raised to the top of the mold to receive the glass, and is then lowered to the bottom thereof, the mold rapidly rotated thus causing the glass to spread evenly up the inside of the same. The cup is then raised, and its edge pushes or ejects the cylinder or other article out of the mold. The cup can be lifted bodily out of the mold, when the cylinder can be separated from it by a slight tap or blow, without damage, only its bottom edge requiring a little grinding perhaps where it has been broken off from the edge of the cup.

Another feature of the invention is that the apparatus can be made as a multiple machine comprising a number of molds brought into action successively. One mold may for instance be in the filling position, another be undergoing rotation, while a third can be having its newly formed cylinder or other article ejected by the cup as above referred to. All these operations can be performed simultaneously and automatically.

A further feature of the invention is that two cams serve for all the main motions, one cam moving the molds successively laterally into the proper position, and the other giving the necessary up-and-down movements for different parts which coöperate with the molds.

In order that the invention may be clearly understood and readily carried into effect reference will now be had to the accompanying diagrammatic drawings which illustrate by way of example one construction of the machine in accordance therewith.

In these drawings:—

Figure 1 is a vertical central section of a machine such as referred to having eight molds, the mold sections corresponding to positions 4 and 8, hereinafter referred to.

Fig. 1$^a$ is a detail view of the means for moving the bottom plate or knife K hereinafter referred to.

Fig. 2 is a plan of the underpart or base of the machine showing the driving mechanism and the main cams, as well as various parts immediately associated therewith.

Fig. 3 shows a part plan of the rotating table with the molds thereon.

According to the arrangement shown, which will serve as an example, the machine may comprise a rotary table A moved intermittently step-by-step by a suitable main cam B B$^1$ carried by a drum or barrel C.

This table A is carried by a ball-bearing A$^1$ and rotates around a hollow central pillar A$^2$. The table has a sleeve A$^3$ surrounding the pillar A$^2$, and this sleeve carries at its upper end another table or ring A$^4$ of smaller diameter than the main table A.

The said main table A may carry eight molds D for instance, which are brought successively into the positions marked 1 to 8 in the plan views. In other words, after one set of operations such as the three above referred to, the table and molds are moved one-eighth of a turn, for another set of the same operations. This is effected by the action of the inclined part B of the cam groove, on one of the set of eight rollers or trucks E$^1$ below the table A. For convenience these rollers are formed by the lower parts of a corresponding set of belt pulleys E hereinafter referred to, mounted on the spindles $d$ of the molds D, these being the pulleys for rotating the molds when the centrifugal action is to take place.

The cam arrangement B B$^1$ for giving the step-by-step movement to the table A is similar to that already well known in glass bottle machinery, for instance in British Patent No. 15625 of 1915.

Briefly stated, after one roller E$^1$ has been moved a division or step (from 6 to 7) by the incline B, it enters the annular part B¹ and holds the table at rest for three-quarters of a turn, while the next roller lies in the position 6 (Fig. 2) ready to enter the mouth of the cam B when it comes around again.

The barrel C carrying the cam B is driven by an electric motor F, through suitable chain gearing F¹ and worm gearing F². This motor is removed in Fig. 1.

The machine is mounted on any suitable base G, which may be of approximately triangular form and provided with three runners or rollers G¹ to permit of its being moved about readily. One of these rollers may be mounted caster-wise in a swiveling piece G² carried by an over-hanging arm or bracket G³ and provided with a handle G⁴ for steering or guiding it when the machine is being moved.

The revolving molds D may have long vertical tubular spindles $d$ extending down through suitable bearings A⁵ carried by the table A. Each spindle has one of the belt-pulleys E fast at the bottom end thereof. D¹ are the cups arranged inside the molds to receive the molten glass. These cups may have long stems or rods $d^1$ extending down the tubular spindles $d$.

The required up and down movements of the cups D¹ in the molds are imparted by pusher pins H H¹ one or both of which may rest on a spring buffer such as H⁸ hereinafter referred to. These pins are carried by arms H² extending from a central sleeve H³ worked up and down by a second main cam B², which lowers it just before the table moves one step, and raises it just after such step. The pusher pins act on the aforesaid cup stem. The second cam B² just referred to, is formed on the end of the drum C, and operates the pushers through a lever $h$ on a rocking shaft $h^1$ which shaft has a pair of arms $h^2$ acting on the sleeve H³.

The second main cam B², also simultaneouly actuates certain other parts by means of the central sleeve H³, as hereinafter referred to.

The arrangement for driving that one of the molds which is in the revolving or spinning position (as shown on the right of Fig. 1) comprises a loose belt-pulley I arranged with its axis vertical, and having the belt which runs over it arranged on edge as it were and driven from a wide counter pulley I². This latter has its spindle placed vertically and carries a second pulley I³. It is driven from a pulley F³ on the motor F, through a belt I⁴ traveling against a guide pulley I⁵.

The aforesaid pulleys E (at the bottom ends of the hollow mold-spindles $d$) come successively directly over this loose pulley at each step-like motion of the table, so that their edges match.

A belt-fork I⁶ carried by a pin I⁷ depending from an over-hanging flange H⁴ at the top of the sleeve H³, moves up and down with the said sleeves.

By this means the belt can be shifted up from the loose pulley I on to the fast pulley E which is just above it, to spin the mold, and then be moved down again on to the loose pulley to leave the other pulley and the table A free to travel another step, and to bring the next fast pulley and mold into the spinning or revolving position.

The filling of the molds is effected in one definite position through a stationary feed mouth, funnel or hopper J under which the molds come in turn. The bottom of this hopper or filler can be closed by a movable plate, trap or "knife" K carried by a swinging arm K¹ which is drawn aside automatically when necessary, to let the glass enter the mold. The filler is carried by an arm J¹ in a collar J².

This automatic action is effected by a cam-rod K² (see detail Fig. 1ᵃ) which acts on a roller K⁴ at the inner end of the arm K¹. The arm and knife K are drawn back into the closing position by a spring K³.

It will be noted that the funnel J and "knife" or trap K are stationary or non-rotary, and it is only the table A and the parts carried thereby which rotate around the hollow central standard or pillar A².

The mold has a movable cap L formed with a central opening through which the glass can enter the mold. The edge L¹ of this opening slightly overlaps the inside edge of the mold annularly by an amount equal to the thickness of the glass article which is to be formed. The overlapping part or annulus L¹ in fact serves to shape the top edge of the molded article. Any suitable means, such as centrifugal balls L² for example, are provided to lock the cap to the mold during the revolving action, while releasing it when the mold stops.

A lifting ring L³ is also arranged around the mold, to raise the cup when required. This ring is carried by a swinging arm L⁴ extending from a vertically sliding rod L⁵ which is moved up by a projection or boss H⁵ on the sleeve H³ to raise the ring L³ and with it the cap or cover L.

Each mold is associated with an upright cam $l$ whereby when the rod L⁵ is pushed upward, it is also turned slightly on its axis to move the lifted cap L aside clear of the mouth of the mold, by a finger L⁶ engaging the cam groove.

The rod L⁵ works tightly in its guides so that it will remain in its raised position instead of dropping by its own weight. For pulling it down again a pair of spring-claws $l^1$ are arranged on the arm H⁵. These claws engage a knob at the lower end of the rod, as the molds successively pass them. In this way the rods L⁵ are again lowered one by one and the caps are replaced on the molds, ready for another filling and molding operation.

Another pin $H^7$, analogous to the pins H $H^1$ but shorter is supported by a spring plunger or yielding buffer $H^8$ at the end of an arm $H^9$. This pin $H^7$ serves simply to lift the cup $D^1$ to the top of the mold, so that its edge comes against the ledge $L^1$ formed by the lid or cover L.

With a set of eight molds, three (or four) only need to be in actual operation at a time. The first of these would be filling, the second spinning and forming the glass cylinder, and the next one (or two) undergoing the ejection operation. The other molds would meanwhile be traveling step-by-step but would simply be empty and cooling down.

The mode of operation of this machine may be described more in detail as follows.

One quarter of a revolution of the cam drum C causes the inclined groove B to move the table one step, for the other three quarters the table stands still.

During this step motion, the central non-rotary sleeve $H^3$ is down, and the end-cam $B^2$ leaves it idle, but when the table A comes to rest, the afore-said end-cam begins to lift the sleeve $H^3$.

As the sleeve rises, the pin $H^7$ acts on the rod $d^1$ of that mold which is in the starting or filling position 1 and lifts it right up to the cap ready to receive the charge, in contrast to the lowered position at the left of Fig. 1.

The conical part or shoulder $h^3$ on the plunger $H^8$ acts to centralize the mold properly at this time.

As regards the mold which is in the spinning position 2 the sleeve $H^3$ in rising moves the belt on the fast pulley E as before explained.

At the same time the mold which is in the "ejecting" position 3 has its cap L lifted clear of the top of the mold, while the mold in position 4 has its cup lifted to eject the finished glass cylinder $D^2$.

The cup D and its stem $d^1$ are finally lifted out by the attendant, the glass removed and the cup immediately replaced. The last mentioned operations can be done practically instantly, so that there is no interruption in the working of the machine.

The arrows show the direction of motion of the mold table, and taking the various positions or steps *seriatim* from 1 to 8, the operations are as follows:—

In position 1 the filling takes place, the trap K being swung aside (see Fig. 3) to allow the molten glass in the funnel J to fall into the cup $D^1$, which has been raised by the thrust pin $H^7$.

The next mold in advance is meanwhile in position 2 and is being rotated by the belt $I^1$, so that the molten glass therein spreads upward from its cup which is now at the bottom of the mold. The glass rises by the centrifugal force above the cup, and forms the glass cylinder for the miner's lamp chimney which is to be made.

The mold in position 3 is ready for the ejecting operation, the projection $H^6$ lifting the rod $L^5$ and cap L, the cap being then caused by the upright cam or scroll $l$ to swing backward or sidewise and uncover the mold D. In this position also, the first pin H partly raises the cup $D^1$ to loosen the same.

In position 4 the second ejector pin $H^1$ completely raises the cup (as on the right in Fig. 1) ready for the glass to be removed and the cup lifted out and cleared of residual glass, as already mentioned.

Position 5 is practically an idle one, the parts remaining as before with the lid L open to allow the cup that may have been taken out, to be replaced.

In position 6 the claws $l^1$ pull down the rod $L^5$ and with it the lid or cover L which under the action of the cam $l$ moves forward sidewise so that it again lies over the mold, as it drops on to the latter.

In positions 7 and 8 the parts remain at rest but cool down further, ready for the next filling operation when position 1 is again reached.

Obviously the invention can be modified in various ways in carrying the same into practice without departing from the general nature thereof.

We claim:—

1. In a machine for the manufacture of hollow glass ware, the combination of a rotatable mold, a cup inside said mold to receive the molten glass and from which the glass spreads over the wall of the mold by the centrifugal action, and means for rotating said mold and cup, substantially as described.

2. In a machine for the manufacture of hollow glass ware the combination of a rotatable mold, a cup arranged to be moved up and down piston-wise inside the mold, a movable cover provided to retain the glass while under the centrifugal action, and means for rotating said parts, substantially as described.

3. In a machine for the manufacture of hollow glass ware, the combination of a series of centrifugal molds, a table around which said molds are grouped, cups inside said molds to receive the molten glass, annular covers to cover and uncover the molds as required, and means for operating said covers, substantially as described.

4. In a machine for the manufacture of hollow glass ware, the combination of a series of rotatable molds, means for putting such molds successively into gear with their driving mechanism at the position at which they are to be rotated, and cups inside the molds working piston-wise therein, substantially as described.

5. In a machine for the manufacture of hollow glass ware, the combination of a series of glass molds arranged on a table having a step by step motion, a plurality of parts coöperating with the molds, a central pillar around which said table turns, a movable sleeve working up and down on said pillar, and means whereby said sleeve at each step transmits the necessary movements to the parts coöperating with the molds, according to the stages of manufacture to be carried on in such molds, substantially as described.

6. In a centrifugal machine for the manufacture of hollow glass articles, according to claim 3, the combination of two main cams, one controlling the step-by-step movements of the molds a plurality of parts coöperating with said molds and cups, and the other the movements of the cups and the covers, and means for operating said cams, substantially as described.

7. In a centrifugal machine for the manufacture of hollow glass ware, the combination of a series of rotating molds, cups moving up-and-down piston wise in said molds, a plurality of parts coöperating with said molds and cups, a rotary table carrying said molds and having a step-by-step motion, a central pillar carrying said table, a central sleeve surrounding said pillar below the table, a cam for raising and lowering said sleeve, and means for communicating motion from said sleeve to the cups and the aforesaid coöperating parts, substantially as described.

In testimony whereof we affix our signatures at Leeds, England, this 27th day of September, 1917.

LOUIS N. BRUNER.
SIMON DOKK OLSEN.